US010415737B2

(12) United States Patent
Alquier et al.

(10) Patent No.: US 10,415,737 B2
(45) Date of Patent: Sep. 17, 2019

(54) CONNECTION DEVICE COMPRISING A FLEXIBLE TUBE FOR COLLECTION OF A LIQUID IN THE EVENT OF LEAKAGE OR OOZING

(71) Applicant: Airbus Operations SAS, Toulouse (FR)

(72) Inventors: Bruno Alquier, Blagnac (FR); Gerard Millet, Pibrac (FR); Thomas Menage, Brest (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 205 days.

(21) Appl. No.: 15/716,064

(22) Filed: Sep. 26, 2017

(65) Prior Publication Data

US 2018/0087707 A1    Mar. 29, 2018

(30) Foreign Application Priority Data

Sep. 29, 2016 (FR) ...................................... 16 59318

(51) Int. Cl.
| F16L 55/168 | (2006.01) |
| F16K 27/12 | (2006.01) |
| F16L 57/00 | (2006.01) |
| F16L 55/07 | (2006.01) |
| G01M 3/28 | (2006.01) |

(52) U.S. Cl.
CPC ............ *F16L 55/168* (2013.01); *F16K 27/12* (2013.01); *F16L 55/07* (2013.01); *F16L 57/00* (2013.01); *G01M 3/2861* (2013.01); *F16L 2201/30* (2013.01)

(58) Field of Classification Search
CPC ......... F16L 55/168; F16L 55/07; F16L 57/00; F16L 2201/30; F16K 27/12; G01M 3/2861

See application file for complete search history.

(56) References Cited

U.S. PATENT DOCUMENTS

| 4,295,669 A | 10/1981 | Laprade et al. | |
| 5,533,760 A | 7/1996 | Welch | |
| 6,164,345 A | 12/2000 | Haddox | |
| 8,826,942 B2 * | 9/2014 | Millet | B64D 13/00 138/104 |
| 2009/0223584 A1 * | 9/2009 | Gray | F16L 13/148 138/109 |
| 2009/0295145 A1 * | 12/2009 | Conrad | F16L 51/022 285/13 |

(Continued)

FOREIGN PATENT DOCUMENTS

| DE | 29818853 | 1/1999 |
| GB | 2274919 | 8/1994 |
| WO | 9600361 | 1/1996 |

OTHER PUBLICATIONS

French Search Report, dated May 18, 2017, priority document.

*Primary Examiner* — James M Hewitt, II
(74) *Attorney, Agent, or Firm* — Greer, Burns & Crain, Ltd.

(57) ABSTRACT

A connection comprising a first duct, a second duct, a flexible tube which comprises a first end configured to cover part of the first duct, and a second end configured to cover part of the second duct, a first clamping system configured to clamp the first end of the flexible tube around the first duct, and a second clamping system configured to clamp the second end of the flexible tube around the second duct.

6 Claims, 2 Drawing Sheets

(56) References Cited

U.S. PATENT DOCUMENTS

| | | | |
|---|---|---|---|
| 2011/0094603 A1* | 4/2011 | Greger | F16L 55/07 137/312 |
| 2013/0014840 A1* | 1/2013 | Millet | G01M 3/045 137/551 |
| 2013/0125655 A1* | 5/2013 | Klopffer | F16L 11/083 73/592 |
| 2016/0265702 A1* | 9/2016 | Strasik | F16L 23/04 |

* cited by examiner

CONNECTION DEVICE COMPRISING A FLEXIBLE TUBE FOR COLLECTION OF A LIQUID IN THE EVENT OF LEAKAGE OR OOZING

CROSS-REFERENCES TO RELATED APPLICATIONS

This application claims the benefit of the French patent application No. 1659318 filed on Sep. 29, 2016, the entire disclosures of which are incorporated herein by way of reference.

BACKGROUND OF THE INVENTION

The present application relates to a connection device comprising a flexible tube for collection of a liquid in the event of leakage or oozing.

According to an embodiment shown in FIG. 1, a connection device 10 of the dynamic type comprises:

a first duct 12, also known as a female duct, which comprises a receptacle 14 at one of its ends;

a second duct 16, also known as a male duct, which comprises at one of its ends a head 18 which is configured to be accommodated in the receptacle 14 of the first duct, and a groove 20 which extends around the entire circumference of the outer surface of the head 18;

an annular seal 22 which is accommodated in the groove 20, and is compressed between the groove 20 in the head of the second duct 16, and the wall of the receptacle 14 of the first duct 12.

In operation, the first and second ducts have circular cross-sections and have combined axes.

For the remainder of the description, the longitudinal direction is parallel to the axis of the first duct. A longitudinal plane contains the axis of the first duct. A transverse plane is a plane which is perpendicular to the axis of the first duct.

According to a first embodiment, the connection device and the ducts are positioned inside rigid outer ducts for collection and drainage of the liquid to a given point in the event of leakage at the connection device.

According to a second embodiment, a central wing box of an aircraft, in which a plurality of connection devices are positioned, is rendered sealed in order to collect the liquid in the event of leakage at one of the connection devices, and to prevent the propagation of the liquid to other areas. This second embodiment makes it possible to eliminate the outer ducts, and consequently reduce the on-board mass.

However, in the event of oozing at one of the connection devices, the aircraft must be immobilized on the ground in order to be repaired.

SUMMARY OF THE INVENTION

An objective of the present invention is to eliminate the disadvantages of the prior art.

For this purpose, the subject of the invention is a connection device comprising a first duct, a second duct, and an area of joining between the first and second ducts, wherein the connection device comprises:

a flexible tube which comprises a first end configured to cover part of the first duct, and a second end configured to cover part of the second duct;

a first clamping system configured to clamp the first end of the flexible tube around the first duct;

a second clamping system configured to clamp the second end of the flexible tube around the second duct;

the first and second clamping systems being arranged on both sides of the joining area.

According to the invention, the flexible tube makes it possible to collect a liquid in the event of leakage or oozing at the area of joining between the first and second ducts, and to prevent the liquid from spreading to the exterior of the flexible tube. Thus, in the event of oozing, the aircraft is not necessarily immobilized on the ground. According to another advantage, the flexible tube forms a barrier, in order to protect the area of joining between the first and second ducts against impurities.

According to another characteristic, the connection device comprises a filling indicator.

According to another characteristic, the flexible tube comprises a first orifice which is configured to make the interior of the flexible tube communicate with the exterior, and the filling indicator comprises a deformable circular wall which closes the first orifice, the deformable circular wall being mobile between an inactive position, in which the deformable circular wall is accommodated inside the flexible tube, and an active position, in which the deformable circular wall is deployed on the exterior of the flexible tube.

According to another characteristic, the first orifice is positioned on a top part of the flexible tube.

According to one embodiment, the deformable circular wall and/or a connection between the deformable circular wall and an edge of the first orifice have mechanical resistance configured to break in the event of substantial leakage.

According to another characteristic, the flexible tube comprises a second orifice configured to make the interior of the flexible tube communicate with the exterior, which orifice is positioned in the lower part of the flexible tube.

According to another characteristic, the second orifice is closed by a drainage system which is configured to occupy a blocked state in which it prevents flow of liquid through the second orifice, and a passing state in which it permits flow of liquid through the second orifice.

According to another characteristic, the flexible tube comprises at least one section in the form of bellows.

BRIEF DESCRIPTION OF THE DRAWINGS

Other characteristics and advantages will become apparent from the following description of the invention, provided purely by way of example, with reference to the appended drawings in which.

DETAILED DESCRIPTION OF THE PREFERRED EMBODIMENTS

Figure 1:
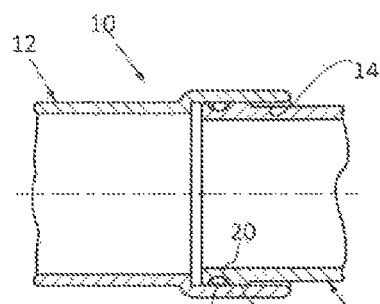
FIG. 1 is a longitudinal cross-section of a connection device which illustrates an embodiment according to the prior art.
Figure 2:
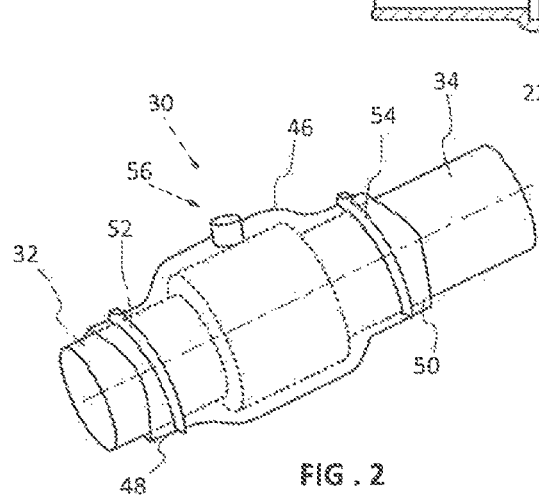
FIG. 2 is a view in perspective of a connection device which illustrates an embodiment according to the invention.
Figure 3:
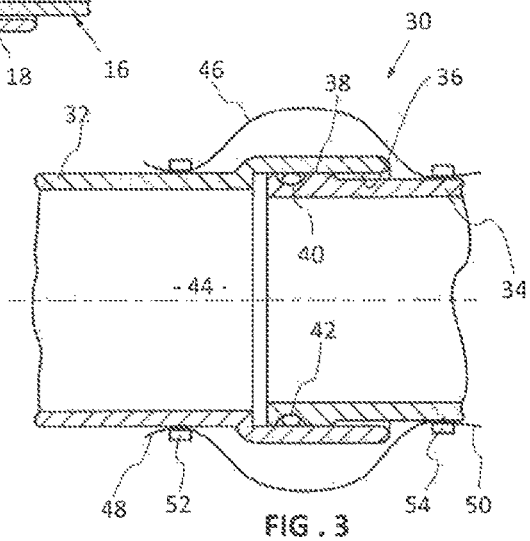
FIG. 3 is a longitudinal cross-section of a connection device which illustrates an embodiment according to the invention.

FIGS. 2 and 3 show a device 30 for connection between a first duct 32 and a second duct 34. According to one application, the first and second ducts 32 and 34 form part of a fuel pipe of an aircraft. It will be appreciated that the invention is not limited to this application.

The connection device is dynamic. Thus, in operation, at least one of the ducts 32, 34 can move relative to the other duct.

According to one embodiment, the first duct 32 comprises a receptacle 36 at one of its ends, and the second duct 34 comprises at one of its ends a head 38 which is configured to be accommodated in the receptacle 36 of the first duct 32, and a groove 40 which extends around the entire circumference of the outer surface of the head 38.

The connection device also comprises an annular seal 42 which is accommodated in the groove 40, and is compressed between the groove 40 in the head 38 of the second duct 34, and the wall of the receptacle 36 of the first duct 32.

According to another embodiment, not represented, the connection device comprises:

a rigid tube which comprises a receptacle at each of its ends;

two ducts which are configured to fit on the ends of the tube, and each comprise a head with a groove in which an annular seal is accommodated.

Irrespective of the embodiment, the connection device comprises a first duct 32, a second duct 34, and an area 44 of joining between the first and second ducts 32 and 34.

According to a characteristic of the invention, the connection device comprises:

a flexible tube 46 which comprises a first end 48 configured to cover part of the first duct 32, and a second end 50 configured to cover part of the second duct 34;

a first clamping system 52 configured to clamp the first end 48 of the flexible tube 46 around the first duct 32;

a second clamping system 54 configured to clamp the second end 50 of the flexible tube 46 around the second duct 34;

the first and second clamping systems 52 and 54 being arranged on both sides of the joining area 44.

Thus, the device according to the invention provides sealing against the liquid between the first duct 32 and the flexible tube 46, as well as ceiling against the liquid between the second duct 34 and the flexible tube 46.

According to the invention, the flexible tube 46 makes it possible to collect liquid in the event of leakage or oozing at the joining area 44, and to prevent the liquid from spreading to the exterior of the flexible tube 46. According to another advantage, the flexible tube 46 protects the annular seal 42 and the wall of the receptacle 36 of the first duct 32 against impurities.

In order to reduce the on-board mass, the first and second clamping systems 52, 54 are positioned as close as possible to the joining area 44.

According to one embodiment, each clamping system 52, 54 is a clamping collar, which for example is made of plastic material.

The flexible tube 46 is deformable, in order to allow the first and second ducts 52, 54 to move relative to one another, such that the connection device is dynamic.

According to one embodiment, the flexible tube 46 is made of a flexible material which is resistant to fuel, such as polytetrafluoroethylene or neoprene for example.

The flexible sleeve 46 is distended between the first and second clamping systems 52, 54 in order to be able to collect liquid in the event of leakage or oozing, and in order to allow the first and second ducts 52, 54 to move relative to one another, such that the connection device is dynamic.

Figure 4A:
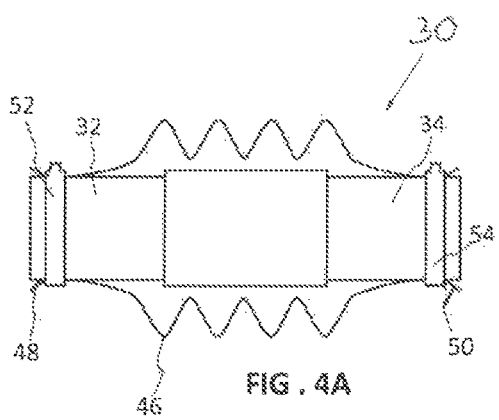
FIGS. 4A and 4B are diagrams of a connection device which illustrate an embodiment according to the invention, respectively in the absence of leakage and in the presence of leakage.
Figure 4B:
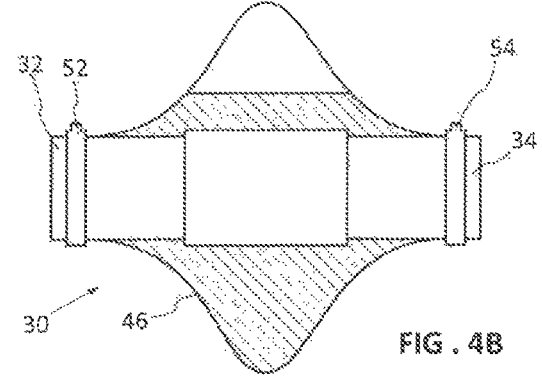

According to a configuration shown in FIGS. 4A and 4B, the flexible tube 46 comprises at least one section in the form of bellows. This configuration makes it possible to increase the capacity of the flexible tube 46 to be deformed and to increase the storage volume for the liquid collected, as illustrated in FIG. 4B.

Figure 5A:
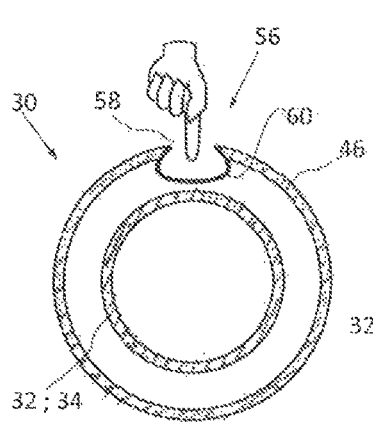
FIGS. 5A to 5C are schematic transverse cross-sections of a connection device equipped with a filling indicator, which cross-sections illustrate another embodiment according to the invention.
Figure 5B:
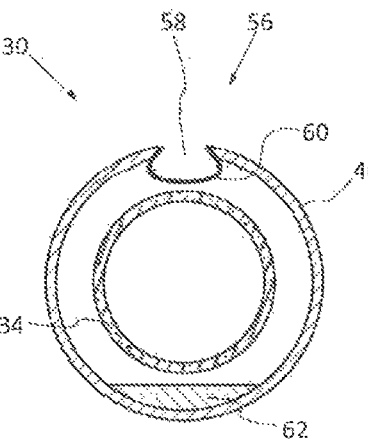

According to another characteristic of the invention, the flexible tube 46 comprises a filling indicator 56, as illustrated in FIGS. 5A and 5B.

According to one configuration, this filling indicator 56 is configured to occupy a first state when the volume of liquid trapped between the flexible tube 46 and the first and second ducts 32, 34 is lower than a given threshold, and a second state when the volume of liquid is higher than, or equal to, the given threshold.

According to one embodiment, the flexible tube 46 comprises a first orifice 58 which makes it possible to make the interior of the flexible tube 46 communicate with the exterior. The filling indicator 56 comprises a deformable circular wall 60 which closes the first orifice 58. The deformable circular wall 60 has a diameter which is larger than the diameter of the first orifice 58, and is connected to the periphery of the latter.

Preferably, the first orifice 58 is positioned on the top part of the flexible tube 46, such that the deformable circular wall 60 is in contact with the gas (generally ambient air) which is present in the flexible tube 46, even in the event of leakage.

This deformable circular wall 60 is mobile between an inactive position (illustrated in FIG. 5A) in which the deformable circular wall 60 is accommodated in the interior of the flexible tube 46, and an active position (illustrated in FIG. 5C) in which the deformable circular wall 60 is deployed on the exterior of the flexible tube 46.

As illustrated in FIG. 5A, when the flexible tube 46 is put into place, the deformable circular wall 60 is positioned inside the flexible tube 46, which corresponds to the first state of the filling indicator 56.

In the event of leakage, the liquid 62 accumulates inside the flexible tube 46, in the lower part. For as long as the level of the liquid 62 is lower than the given threshold, the deformable circular wall 60 remains in its inactive position illustrated by FIG. 5A, since the pressure in the interior of the flexible tube 46 is not sufficient to give rise to the displacement of the deformable circular wall 60 into its active position illustrated by FIG. 5C.

Figure 5C:
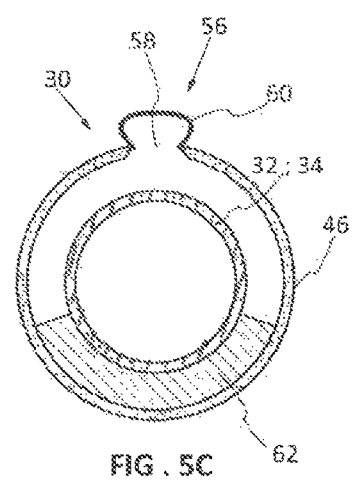
Figure 6:
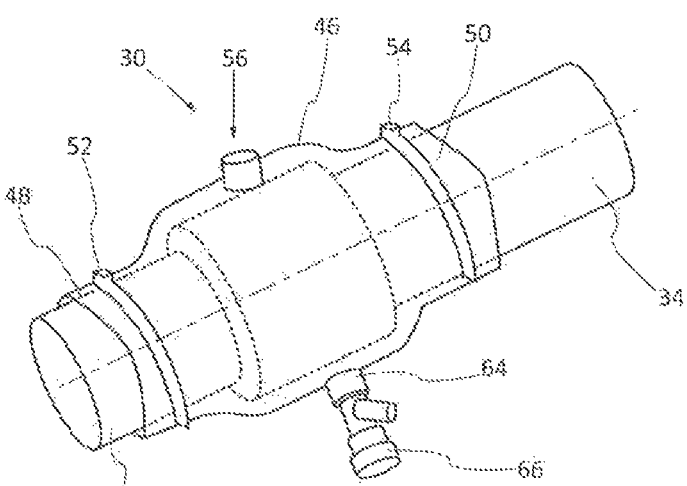
FIG. 6 is a view in perspective of a connection device equipped with a drainage system illustrating another embodiment according to the invention.

When the level of the liquid 62 reaches the given threshold, the deformable circular wall 60 is deployed into its active position illustrated by FIG. 5C, since the pressure in the interior of the flexible tube 46 is sufficient to give rise to the displacement of the deformable circular wall 60 to the exterior of the flexible tube 46.

According to another characteristic, the deformable circular wall 60 and/or the connection between the deformable circular wall 60 and the edge of the first orifice 58 have mechanical configured to provide the function of a fuse and break in the event of substantial leakage.

According to another characteristic, the flexible tube 46 comprises a second orifice 64, which makes it possible to make the interior of the flexible tube 46 communicate with the exterior, positioned in the lower part of the flexible tube 46, in order to obtain complete drainage of the flexible tube 46.

This second orifice 64 can be closed by a stopper or by a drainage system 66, for example a valve shown in FIGS. 6, 7A, 7B and 7D.

This drainage system 66 is configured to occupy a blocked state, in which it prevents flow of liquid through the second orifice 64, and a passing state, in which it permits flow of liquid through the second orifice 64.

According to an operative mode illustrated in FIGS. 7A to 7D, the filling indicator 56 and the drainage system 66 are used to determine a flow rate of the leakage.

Figure 7A:
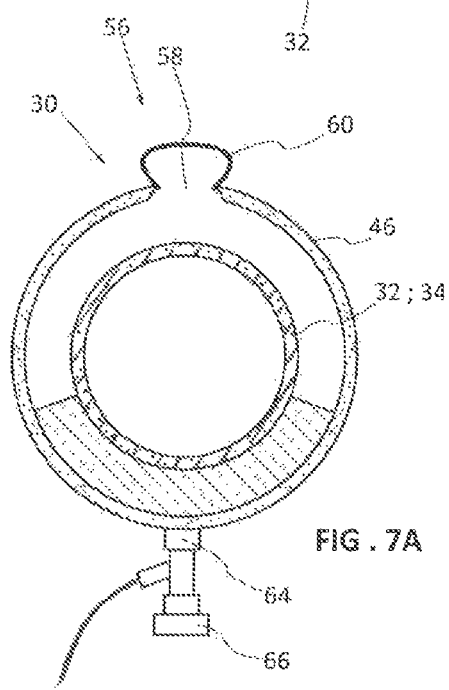
FIGS. 7A to 7D are diagrams which illustrate an operative mode for measurement of the flow of a leakage.

As illustrated in FIG. 7A, the drainage system 66 is in the passing state in order to empty the flexible tube 46 completely.

Figure 7B:
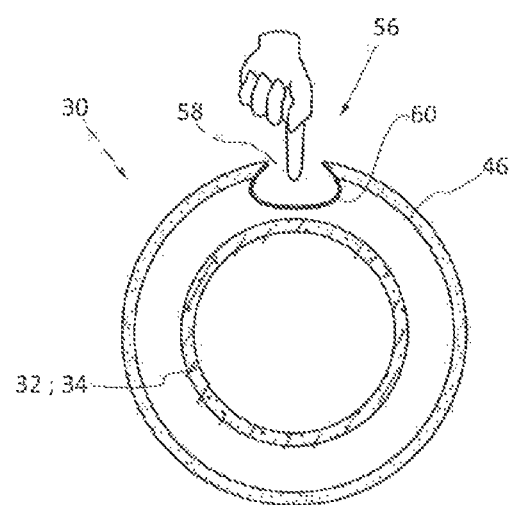

When the flexible tube 46 is empty, the deformable circular wall 60 of the filling indicator 56 is repositioned in the interior of the flexible tube 46, and the drainage system 66 is in the blocked state, as illustrated in FIG. 7B.

Figure 7C:
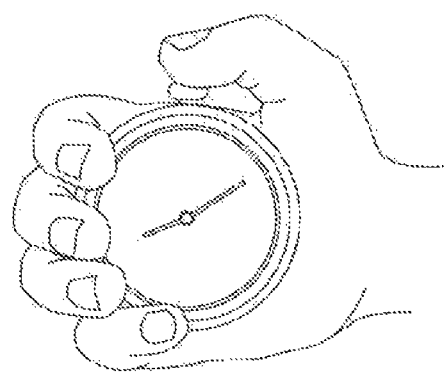
Figure 7D:
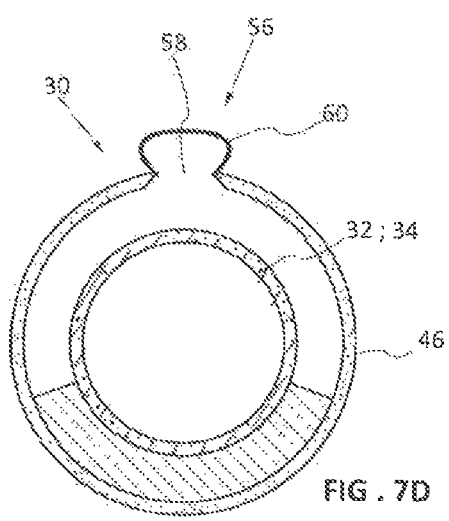

As illustrated in FIG. 7C, there is a measurement of the time taken until the filling indicator 46 changes state, corresponding to the emergence of the deformable circular wall 60, as illustrated in FIG. 7D.

When the volume of liquid necessary to give rise to the change of state of the filling indicator 56, emergence of the deformable circular wall 60 from the flexible sleeve 46, and the duration of the change of state are known, it is possible to determine the flow rate of the leakage, which is equal to the volume divided by the duration.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection device comprising a first duct, a second duct, and an area of joining between the first and second ducts, wherein the connection device comprises:
    a flexible tube which comprises a first end configured to cover part of the first duct, and a second end configured to cover part of the second duct;
    a first clamping system configured to clamp the first end of the flexible tube around the first duct;
    a second clamping system configured to clamp the second end of the flexible tube around the second duct;
    the first and second clamping systems being arranged on both sides of the joining area;
    wherein the connection device comprises a filling indicator; and
    wherein the flexible tube comprises a first orifice which is configured to make the interior of the flexible tube communicate with the exterior, and the filling indicator comprises a deformable circular wall which closes the first orifice, said deformable circular wall being mobile between an inactive position, in which the deformable circular wall is accommodated inside the flexible tube, and an active position, in which the deformable circular wall is deployed on the exterior of the flexible tube.

2. The connection device as claimed in claim 1, wherein the first orifice is positioned on a top part of the flexible tube.

3. The connection device as claimed in claim 1, wherein at least one of the deformable circular wall or a connection between the deformable circular wall and an edge of the first orifice, have mechanical resistance configured to break in the event of substantial leakage.

4. The connection device as claimed in claim 1, wherein the flexible tube comprises a second orifice configured to make the interior of the flexible tube communicate with the exterior, which orifice is positioned in a lower part of the flexible tube.

5. The connection device as claimed in claim 4, wherein the second orifice is closed by a drainage system which is configured to occupy a blocked state in which the drainage system prevents flow of liquid through the second orifice, and a passing state in which the drainage system permits flow of liquid through the second orifice.

6. The connection device as claimed in claim 1, wherein the flexible tube comprises at least one section in the form of a bellows.

* * * * *